(No Model.)
R. C. SMITH.
SAFETY DEVICE FOR ELEVATORS.
No. 301,172. Patented July 1, 1884.
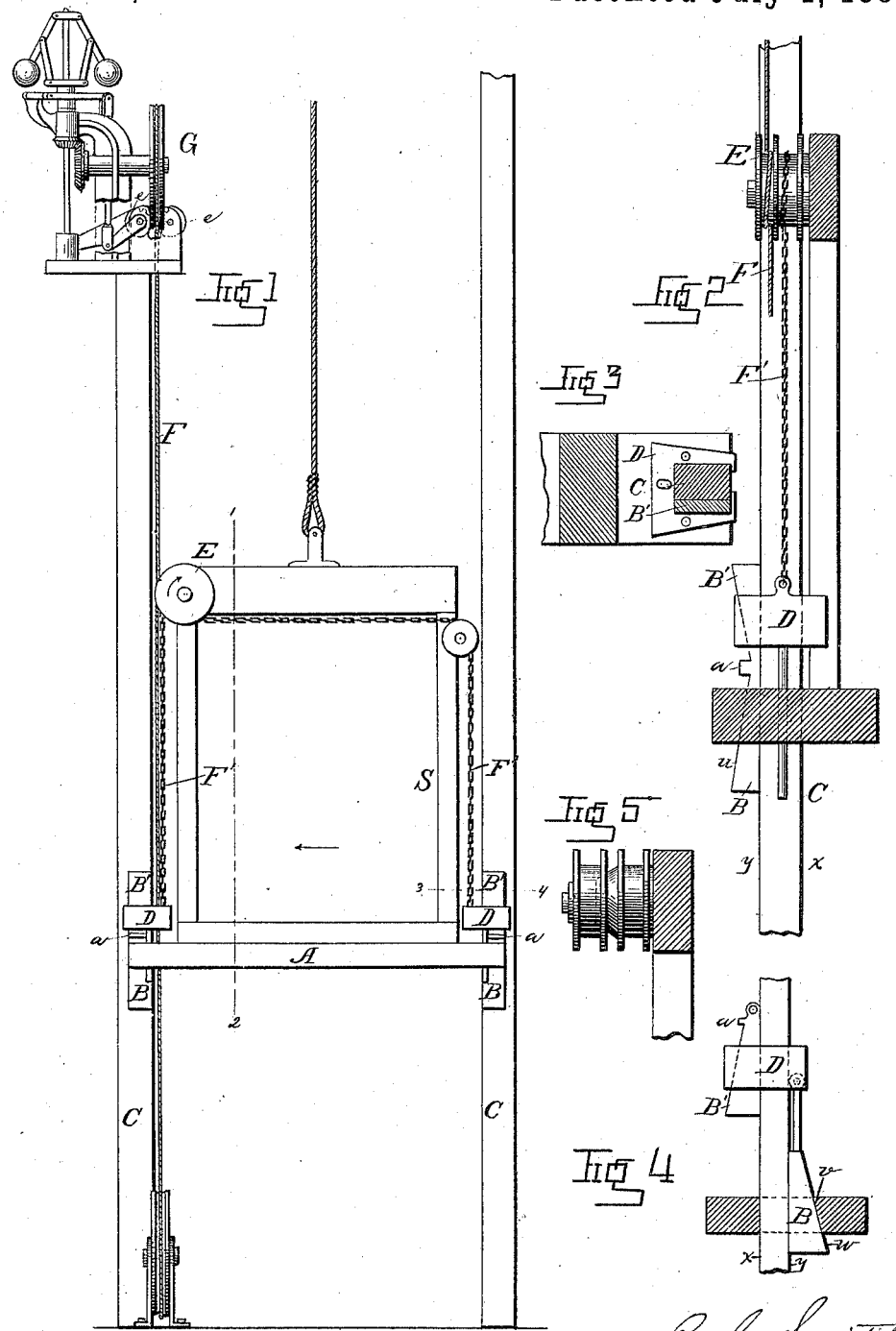
Witnesses:
John G. Hinkel
H. E. Hansmann.
R. C. Smith
Inventor;
By Foster & Freeman
Attys.

UNITED STATES PATENT OFFICE.

RUDOLPH C. SMITH, OF YONKERS, NEW YORK.

SAFETY DEVICE FOR ELEVATORS.

SPECIFICATION forming part of Letters Patent No. 301,172, dated July 1, 1884.

Application filed November 16, 1883. (No model.)

*To all whom it may concern:*

Be it known that I, RUDOLPH C. SMITH, a citizen of the United States, and a resident of Yonkers, Westchester county, New York, have invented certain new and useful Improvements in Safety Devices for Elevators, of which the following is a specification.

My invention is an improvement in safety devices for elevators; and it consists in the combination, with the elevator-cage and certain upright bars and guides, of devices for creating a determined and regulated frictional resistance and means for putting them in operation upon the too rapid descent of the cage, so as to retard or arrest the downward movement.

In the accompanying drawings, Figure 1 is an elevation of sufficient of an elevator to illustrate my improvement, showing the cage, guides, and safety devices. Fig. 2 is an enlarged section on line 1 2, Fig. 1, looking in the direction of the arrow. Fig. 3 is a sectional plan on the line 3 4, Fig. 1. Figs. 4 and 5 are views illustrating modifications.

The cage or platform S is of any suitable construction, and is combined with any of the usual elevating mechanisms, whereby it is moved vertically within the well. At opposite sides of the cage are the stationary parallel bars C C, which may constitute or supplement the usual vertical guide-bars, and beneath the cage extends a cross-bar or beam, A, having notches at the ends to receive the bars C. One side of each notch presents the face parallel to the face $x$ of the adjacent bar C. The other side, $v$, of said notch is inclined, and at such distance from face $y$ of the guide as to permit the introduction of a wedge, B, the vertical face of which is opposite the face $y$, while the angle of the opposite face, $w$, corresponds to that of the face $v$. A lip or other suitable stop, $a$, upon each wedge B permits the limited downward movement of the latter with respect to the beam A, so that the wedge can be carried normally with the beam, hanging loosely between the latter and the guide or bar as the cage moves up or down. Upon the application of any force tending to retard or stop the movement of the wedge B, the descent of the cage will bring the inclined face $v$ against the inclined side $w$ of the wedge, and the vertical face of the wedge will be brought to bear against the face $y$ of the bar C until the friction between the sides of the bar and the faces of the wedge and beam is such as to retard or prevent the downward movement of the cage. By varying the angle of the face $w$ of the wedge the relative degree of friction between the faces $v$ and $y$ and the corresponding faces of the wedge may be changed, so that the friction on the inclined side of the wedge may be equal to or greater or less than that between the wedge and the bar C, thereby determining the frictional resistance.

Different means may be employed for arresting or retarding the movement of the wedge. For instance, it may be connected directly or indirectly with a governor-rope, F, such as employed in the well-known Otis safety-governor patented May 25, 1880, No. 228,107, which rope travels with the cage, passes between the clamps $e$ $e$, and imparts motion to a governor, G, connected to said clamps, so that upon any undue speed the said clamps clutch the rope and hold it immovably or with a determined frictional resistance. It will be apparent that if the wedge or wedges should be connected with the said rope F, and the latter under the action of the governor move with a determined resistance, a constant pull would be exerted on the wedge, while the beam A, moving upon the wedge, would force the same against the face of the bar C, exerting a constant retarding force, and causing a speedy but uniform decrease of speed and the final arrest of the movement of the cage by holding it in frictional contact with the bars. Instead of applying a frictional resistance to the movement of the rope F, the latter may be positively clamped by the jaws $e$ $e$, and the rope may be passed one or more times around a smooth drum, E, turning upon a journal secured to the frame of the cage, a chain or cable, F', being connected to the wedge and wound upon the drum. When the motion of the rope F is arrested, the drum E will be revolved in the direction of its arrow and the wedge will be drawn between the bar and beam with a force limited by the friction between the surface of the drum and the rope, the latter sliding round the drum if the movement of the cage continues to any great extent, the breaking of the rope being thus prevented. As a general thing, two or more wedges are employed, in which case a rope or chain, F', extends from each to the drum E over suitable guide-pulleys.

To secure a greater amount of frictional surface and greater power than results from the use of a single wedge at one or both sides of the cage, I employ additional wedges and means whereby to secure a differential action, or an action whereby a comparatively light power arresting one wedge or series of wedges will secure a much greater force to arrest the movement of other series. For instance, in connection with the devices already described, I employ slides D, notched to fit the bars C, loosely connected so as to move with the cage, and supplemental wedges B' between the inclined faces of the notches in the slides and the bars. In Figs. 1 and 2 the wedges B' constitute prolongations of the wedges B, in which case the slides D are connected directly or indirectly with the governor-rope or supplemental rope F', and upon their movements being retarded or stopped will cause the faces of the wedges B' to be jammed against the bars C, creating a definite frictional resistance to the movement of the wedge B' greater than would result from any direct connection of the rope F with said wedge, and a still greater resistance to the movement of the wedge B is thus secured, so that a comparatively slight tension upon the rope F will insure a powerful frictional application of the wedges to the faces of the bars, and the arrest of the downward movement of the cage. A slightly different arrangement is shown in Fig. 4, where the wedge B' is separate from the wedge B, and is connected with a governor-rope, either by the intervention of the above-mentioned drum E or otherwise, the wedge B being connected to the slide or clamp D. The action in this case is the same as in that described.

Instead of the rotating governor illustrated, I may use a pneumatic or hydraulic governor, friction-clutch, or other device, which will retard the movement of the rope if the cage move too quickly.

Instead of having the rope F slip on the drum, it may turn one section of the drum positively, and the other section may be held in frictional contact with the first, as shown in Fig. 5.

It will be apparent that the taper of the wedges may be varied according to circumstances to secure a greater or less effect, and that said wedges may be arranged between any part of the cage and the bars or other stationary vertical object.

Without limiting myself to the construction and arrangement of parts illustrated, I claim—

1. The combination of a cage sliding adjacent to vertical bars, wedges arranged between the bars and parts of the cage, and a governing-rope and connections with said wedges and means for retarding the movement of the rope upon any undue increase in the speed of the cage, substantially as set forth.

2. The combination, with wedges arranged to act between a cage and bars contiguous thereto, of one or more series of wedges connected directly or indirectly to the first, and means for arresting the movement of the supplemental wedges when the cage exceeds its normal speed, substantially as specified.

3. The combination of a cage, wedges arranged between the cage and vertical stationary bearings, a governor-rope, and connections, whereby upon any excess of speed the wedges are drawn between the cage and bearings with a regulated power, substantially as set forth.

4. The combination of the cage, wedges, governor-rope, and a frictional connection between the governor-rope and wedges, substantially as specified.

5. The combination of the cage, vertical bars, wedges B, supplemental wedges B', and slides D, and means, substantially as described, for arresting the vertical movement of the upper wedges when the cage exceeds its normal speed, substantially as set forth.

6. The combination of the cage, bars, and wedges with the rope and friction device, whereby the movement of the cage is permitted during a constant uniform pull upon the wedges, substantially as specified.

7. The combination of the governor-rope, wedges, chains or cords F', and friction device E, substantially as set forth.

In testimony whereof I have signed my name to this specification in the presence of two subscribing witnesses.

RUDOLPH C. SMITH.

Witnesses:
L. H. JOHNSON,
WILH. HIRSCH.